(12) United States Patent
Theertham

(10) Patent No.: US 11,815,017 B2
(45) Date of Patent: Nov. 14, 2023

(54) FAN BLADE PLATFORM FOR GAS TURBINE ENGINE

(71) Applicant: Raytheon Technologies Corporation, Farmington, CT (US)

(72) Inventor: Arun K. Theertham, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 260 days.

(21) Appl. No.: 16/850,848

(22) Filed: Apr. 16, 2020

(65) Prior Publication Data

US 2021/0324793 A1    Oct. 21, 2021

(51) Int. Cl.
*F02C 7/00* (2006.01)
*F01D 11/00* (2006.01)
*F02C 7/28* (2006.01)

(52) U.S. Cl.
CPC .............. *F02C 7/00* (2013.01); *F01D 11/005* (2013.01); *F02C 7/28* (2013.01); *F05D 2220/32* (2013.01); *F05D 2240/24* (2013.01); *F05D 2240/55* (2013.01); *F05D 2240/80* (2013.01); *F05D 2260/606* (2013.01)

(58) Field of Classification Search
CPC .. F02C 7/00; F02C 7/28; F01D 11/005; F01D 11/006; F01D 11/008; F05D 2240/24; F05D 2240/55; F05D 2240/80; F05D 2260/606; F05D 2220/32
See application file for complete search history.

(56) References Cited

U.S. PATENT DOCUMENTS

| 3,294,364 | A |  | 12/1966 | Stanley |
| 4,183,720 | A |  | 1/1980 | Brantley |
| 4,875,830 | A | * | 10/1989 | Trousdell ............... F01D 5/3038 416/215 |
| 8,535,013 | B2 |  | 9/2013 | Care et al. |
| 9,228,444 | B2 |  | 1/2016 | Evans et al. |
| 9,896,949 | B2 |  | 2/2018 | Robertson |
| 2009/0269203 | A1 | * | 10/2009 | Care ...................... F01D 11/008 416/221 |
| 2012/0148388 | A1 | * | 6/2012 | Bottome ............... F01D 11/008 415/170.1 |

(Continued)

FOREIGN PATENT DOCUMENTS

| EP | 2594773 |  | 5/2013 |  |
| EP | 3489463 |  | 5/2019 |  |
| GB | 2416568 | A * | 2/2006 | ........... F04D 29/542 |

OTHER PUBLICATIONS

Partial EP Search Report for EP 21168357.8 dated Aug. 5, 2021.

*Primary Examiner* — Woody A Lee, Jr.
*Assistant Examiner* — Elton K Wong
(74) *Attorney, Agent, or Firm* — Carlson, Gaskey & Olds, P.C.

(57) ABSTRACT

A fan blade platform assembly includes a pressure side platform half that includes a first attachment wall, a first gas path wall, and a first connecting wall attached to both the first attachment wall and the first gas path wall. A suction side platform half includes a second attachment wall, a second gas path wall, and a second connecting wall attached to both the second attachment wall and the second gas path wall. A seal engages the pressure side platform half and the suction side platform half.

7 Claims, 5 Drawing Sheets

(56) References Cited

U.S. PATENT DOCUMENTS

| | | | |
|---|---|---|---|
| 2012/0244003 A1* | 9/2012 | Mason | F01D 11/008 |
| | | | 416/219 R |
| 2013/0330196 A1 | 12/2013 | Brown | |
| 2014/0086751 A1* | 3/2014 | Bottome | F01D 11/008 |
| | | | 416/193 R |
| 2016/0230568 A1* | 8/2016 | Sippel | F01D 9/041 |
| 2017/0022824 A1* | 1/2017 | Turner | F01D 5/02 |
| 2017/0145829 A1* | 5/2017 | Tatton | F01D 5/3007 |
| 2018/0187558 A1* | 7/2018 | Thistle | F01D 11/006 |

* cited by examiner

FAN BLADE PLATFORM FOR GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The fan section includes fan blades with spacers or platforms between adjacent blades at a radially inner edge of the flowpath. The platforms can be integral with the fan blades or separately attached to the fan blade.

SUMMARY

In one exemplary embodiment, a fan blade platform assembly includes a pressure side platform half that includes a first attachment wall, a first gas path wall, and a first connecting wall attached to both the first attachment wall and the first gas path wall. A suction side platform half includes a second attachment wall, a second gas path wall, and a second connecting wall attached to both the second attachment wall and the second gas path wall. A seal engages the pressure side platform half and the suction side platform half.

In a further embodiment of any of the above, the first attachment wall includes an adhesive for securing the pressure side platform half to a fan blade. The second attachment wall includes an adhesive for securing the suction side platform half to a suction side of an adjacent fan blade.

In a further embodiment of any of the above, the seal is fixed relative to one of the first connecting wall and the second connecting wall and is in movable engagement with to the other of the first connecting wall and the second connecting wall. The seal is V-shaped and follows a curvilinear path in an axial direction.

In a further embodiment of any of the above, the first gas path wall includes a first ledge extending beyond an intersection with the first connecting wall and the second gas path wall includes a second ledge extending beyond an intersection with the second connecting all and the seal engages a non-gas path side of the first ledge and a non-gas path side of the second ledge.

In a further embodiment of any of the above, the first gas path wall includes a first edge at an intersection of the first attachment wall and a second edge opposite the first edge. The first edge of the first gas path wall follows a convex profile and the second edge of the first gas path wall follows a concave profile.

In a further embodiment of any of the above, the second gas path wall includes a first edge at an intersection with the second attachment wall and a second edge opposite the first edge. The first edge of the second gas path wall follows a concave profile and the second edge of the second gas path wall follows a convex profile.

In a further embodiment of any of the above, at least one passageway extends through at least one of the first attachment wall or the first connecting wall and at least one second passageway extends through at least one of the second attachment wall or the second connecting wall.

In another exemplary embodiment, a gas turbine engine includes a fan section for directing air into a fan bypass duct. The fan section includes at least a first fan blade having a pressure side wall and a first suction side wall and a second fan blade having a second pressure side wall and a second suction side wall. A fan blade platform assembly includes a pressure side platform half that includes a first attachment wall, a first gas path wall, and a first connecting wall attached to both the first attachment wall and the first gas path wall. A suction side platform half includes a second attachment wall, a second gas path wall, and a second connecting wall attached to both the second attachment wall and the second gas path wall, A seal engages the pressure side platform half and the suction side platform half.

In a further embodiment of any of the above, the first attachment wall includes an adhesive for securing the pressure side platform half to the pressure side of the first fan blade. The second attachment wall includes an adhesive for securing the suction side platform half to the second suction side of second fan blade.

In a further embodiment of any of the above, the pressure side platform half includes a first connecting wall attached to both the first attachment wall and the first gas path wall. The suction side platform includes a second connecting wall attached to both the second attachment wall and the second gas path wall.

In a further embodiment of any of the above, the seal is fixed relative to one of the first connecting wall and the second connecting wall and is in movable engagement with to the other of the first connecting wall and the second connecting wall.

In a further embodiment of any of the above, the seal engages a non-gas path side of the first gas path wall and a non-gas path side of the second gas path wall.

In a further embodiment of any of the above, the first fan blade includes a first leading edge and a first trailing edge. The second fan blade includes a second leading edge and a second trailing edge. The pressure side platform half and the suction side platform half each extend forward beyond the first fan blade leading edge and the second fan blade leading edge and aft beyond the first trailing edge and second trailing edge.

In a further embodiment of any of the above, a second suction side platform half is attached to the first suction side of the first fan blade. A retention ring extends through an internal longitudinal passageway in the pressure side platform half and an internal longitudinal passageway in the second suction side platform half.

In a further embodiment of any of the above, first fan blade includes a first leading edge and a first trailing edge. The second fan blade includes a second leading edge and a second trailing edge. The pressure side platform half and the suction side platform half each include a forward edge aft of the first leading edge and second leading edge and an aft edge forward of the first trailing edge and the second trailing edge.

In a further embodiment of any of the above, the first fan blade includes a first protrusion on the first pressure side that engages the pressure side platform half. The second fan blade includes a second protrusion on the second suction side that engages the suction side platform half.

In another exemplary embodiment, a method of forming a fan blade platform includes wrapping a composite material around a mandrel to form a fan blade platform half having a gas path wall, an attachment wall, and a connecting wall attached to the gas path wall and the attachment wall. The composite material is formed to the mandrel. The mandrel is removed to form a central passageway that extends through a length of the fan blade platform half.

In a further embodiment of any of the above, the gas path wall includes a first edge at an intersection with the attachment wall and a second edge opposite the first edge with the first edge following a convex profile and the second edge following a concave profile.

In a further embodiment of any of the above, the gas path wall includes a first edge at an intersection with the attachment wall and a second edge opposite the first edge. The first edge follows a concave profile and the second edge follows a convex profile.

In a further embodiment of any of the above, at least one passageway is formed that extends through the attachment wall and the connecting wall.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2 is a perspective schematic view of a fan hub with a pair of fan blades having a fan blade platform there between.

DETAILED DESCRIPTION

Figure 1:
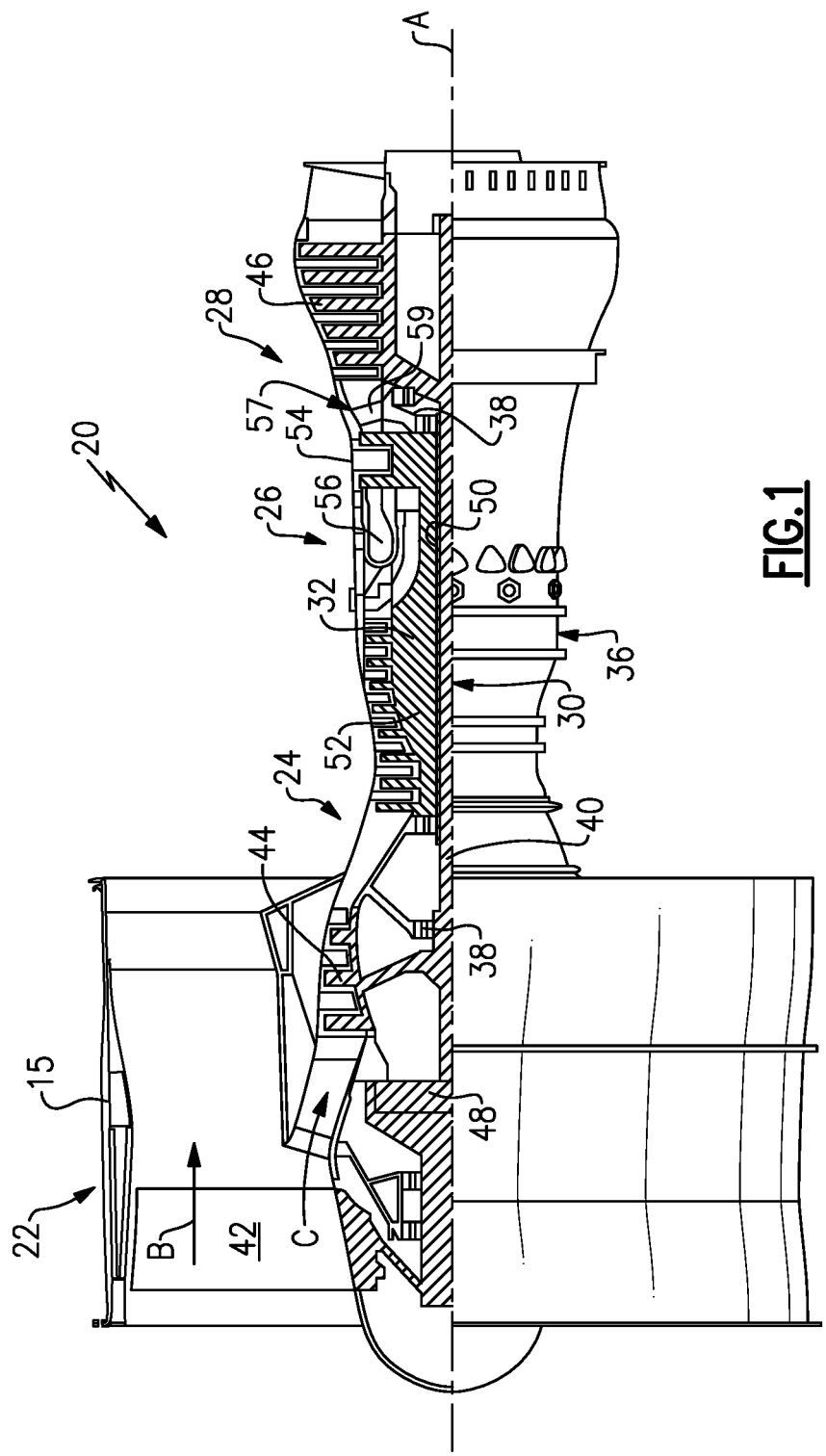
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow half B in a bypass duct defined within a housing 15, such as a fan case or nacelle, and also drives air along a core flow half C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes fan blades 59 which are in the core airflow half C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7\ °\ R)]^{0.5}$. The "Low corrected fan tip speed" as disclosed herein according to one non-limiting embodiment is less than about 1150 ft/second (350.5 meters/second).

Figure 2:
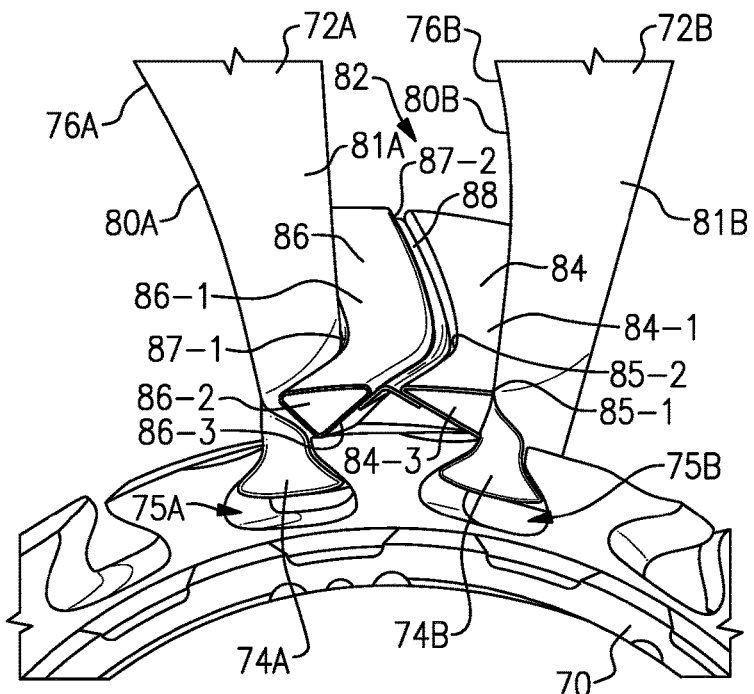

FIG. 2 illustrates an enlarged view of a fan hub 70, a first fan blade 72A, a second fan blade 72B, and a fan blade platform 82 located between the first and second fan blades 72A, 72B. Although only a single platform 82 and pair of fan blades 72A, 72B are shown in the illustrated example, a plurality of fan blades 72 would surround the fan hub 70 with one of the platforms 82 between each adjacent pairs of fan blades 72.

The first fan blade 72A is secured to the fan hub 70 with a first root portion 74A located in a first fan hub recess 75A in the fan hub 70 and the second fan blade 72B is secured to the fan hub 70 with a second root portion 74B located in a second fan hub recess 75B in the fan hub 70. The first and second fan blades 72A, 72B each include a pressure side 80A, 80B and a suction side 81A, 81B that extend between a leading edge 76A, 76B and a trailing edge 78A, 78B (FIG. 10), respectively.

The fan blade platform 82 extends between the first and second fan blades 72A, 72B and is located immediately radially outward of the first and second root portions 74A, 74B, respectively. The fan blade platform 82 includes a pressure side platform half 84 and a suction side platform half 86. A seal 88 engages the pressure side platform half 84 and the suction side platform half 86 to prevent air from passing between the two platform halves 84, 86. The pressure side platform half 84 is fixed relative to the pressure side 80B on the second fan blade 72B and the suction side platform half 86 is fixed relative to the suction side 81A of the first fan blade 72A. In this disclosure, radial or radially and axial or axially is in relation to the engine axis A unless stated otherwise.

As shown in FIGS. 2-5, the suction side platform half 86 includes a gas path wall 86-1, an attachment wall 86-2, and a connecting wall 86-3 defining a triangular cross-section. In the illustrated example, the suction side platform half 86 is formed from a composite material including at least one or a plurality of plies. The suction side platform half 86 includes a first edge 87-1 located at an intersection of the gas path wall 86-1 and the attachment wall 86-2. The first edge 87-1 follows a concave profile along a convex profile of the suction side 81A of the first fan blade 72A. A second edge 87-2 is located opposite the first edge 87-1 at an intersection of the first gas path wall 86-1 and the connecting wall 86-3. The second edge 87-2 follows a convex profile similar to the convex profile of the suction side 81A of the first fan blade 72A.

The pressure side platform half 84 includes a gas path wall 84-1, an attachment wall 84-2, and a connecting wall 84-3 defining a triangular cross-section. In the illustrated example, the pressure side platform half 84 is formed from a composite material including at least one or a plurality of plies. The pressure side platform half includes a first edge 85-1 located at an intersection of the gas path wall 84-1 and the attachment wall 84-2. The first edge 85-1 follows a convex profile along a concave profile of the pressure side 80B of the second fan blade 72B. A second edge 85-2 is located opposite the first edge 85-1 at an intersection of the gas path wall 84-1 and the connecting wall 84-3. The second edge 85-2 follows a concave profile similar to the concave profile of the pressure side 80B while maintaining a constant gap or spacing with the convex profile of the second edge 87-2.

In the illustrated example, the seal 88 is located adjacent the second edges 85-2, 87-2 and is made of an elastomeric material, such as rubber. Additionally, the seal 88 is fixed relative to one of the connecting walls 84-3, 86-3 with an adhesive and movable relative to the other of the connecting wall 84-3, 86-3. By fixing the seal 88 to only one of the suction side platform half 86 and pressure side platform half 84, the seal 88 accommodates for movement caused by thermal growth and engine loading to prevent gas path air from leaking between the two platform halves 84, 86 into an internal cavity. Also in the illustrated example, the seal 88 includes a V-shaped cross section that follows a curvilineal profile in an axial direction following the second edges 85-2, 87-2. Therefore, the seal 88 does not extend linearly or straight.

Figures 3, 4:
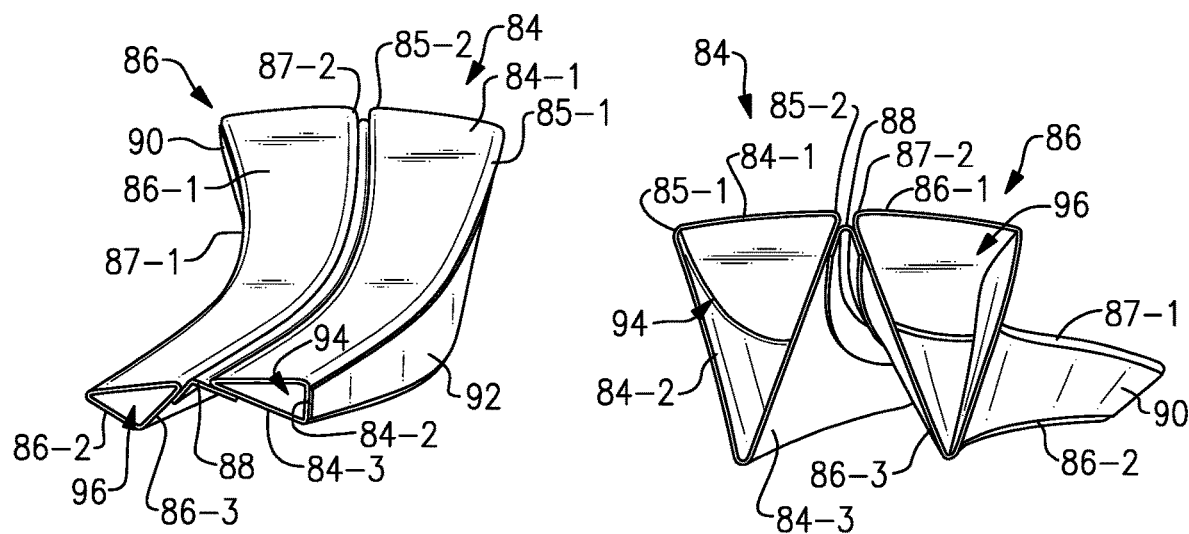
FIG. 3 is a frontal perspective schematic view of the fan blade platform of FIG. 2.
FIG. 4 is an aft perspective schematic view of the fan blade platform of FIG. 2.

The suction side platform half 86 is fixed relative to the suction side 81A of the first fan blade 72A with an adhesive film 90 (FIG. 4). The adhesive film 90 covers a majority of an outer surface of the attachment wall 86-2 or to a perimeter of the attachment wall 86-2. Similarly, the pressure side platform half 84 is attached to the pressure side 80B of the second fan blade 72B with an adhesive film 92 (FIG. 3). The adhesive film 92 also covers a majority of the attachment wall 84-2 or to a perimeter of the attachment wall 84-2.

As shown in FIGS. 3 and 4, the pressure side platform half 84 includes an internal passageway 94 that is at least partially defined by the gas path wall 84-1, the attachment wall 84-2, and the connecting wall 84-3. In the illustrated example, the internal passageway 94 defines a triangular profile with a radial height that increases when moving in an axially downstream direction. Furthermore, a cross-sectional area of an inlet (FIG. 3) to the internal passageway 94 is smaller than a cross-sectional area of an outlet (FIG. 4) to the internal passageway 94.

Similarly, the suction side platform half 86 includes an internal passageway 96. The internal passageway 96 is at least partially defined by the gas path wall 86-1, the attachment wall 86-2, and the connecting wall 86-3. In the illustrated example, the internal passageway 96 defines a triangular profile with a radial that increases when moving in an axially downstream direction. Furthermore, a cross-sectional area of an inlet (FIG. 3) to the internal passageway 96 is smaller than a cross-sectional area of an outlet (FIG. 4) of the internal passageway 96.

Figure 5:
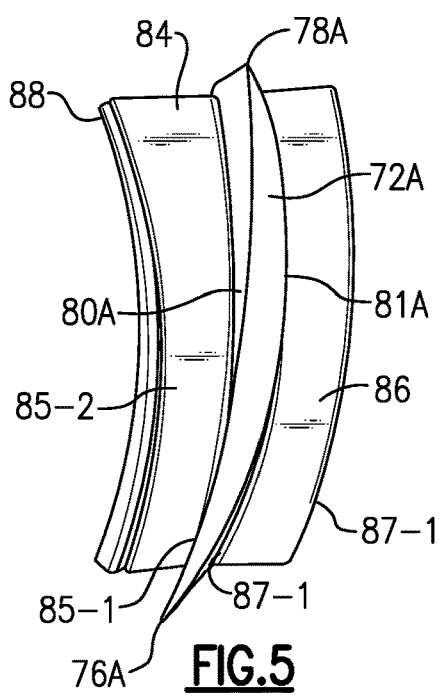
FIG. 5 is a radially inner schematic view of one of the fan blades with a pressure side platform half and a suction side platform half.
Figure 14:
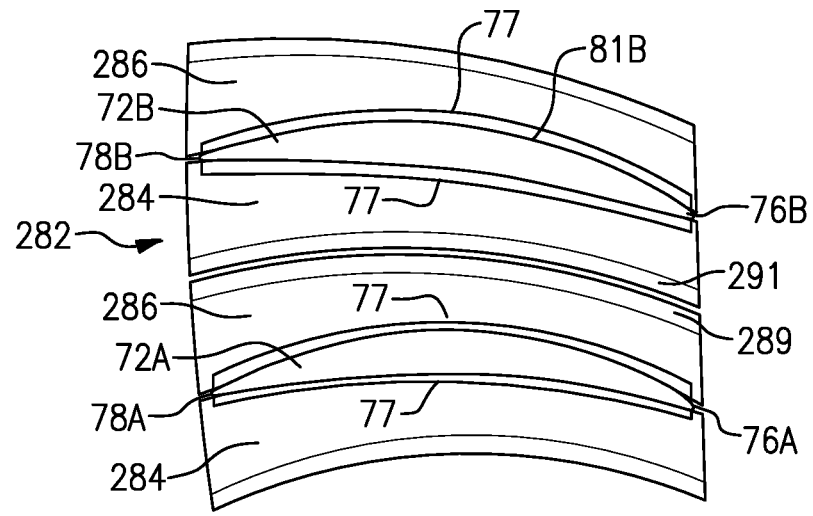
FIG. 14 is a top schematic view of yet another fan blade platform.

In the illustrated example shown in FIG. 5, the leading edge 76A of the fan blade 72A extends axially forward of an upstream edge of the suction side platform half 86 and an upstream edge of the pressure side platform half 84. However, the leading 76A need not extend axially forward of the platforms 84, 86 as shown in FIG. 14. In this disclosure, upstream or downstream and forward and aft are in relation to a direction of air flow through the gas turbine engine unless stated otherwise. In the illustrated example, the seal 88 is fixed relative to the pressure side platform half 84 and is therefore movable relative to a corresponding suction side platform half 86.

Figure 6:
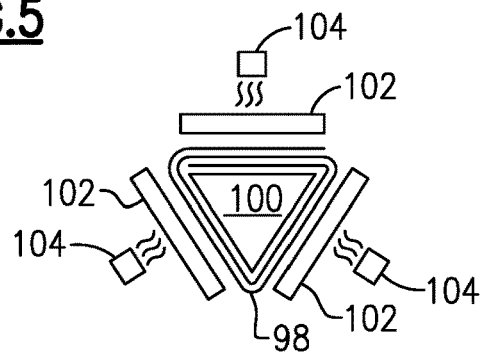
FIG. 6 illustrates a method of forming one of the pressure side or suction side platform halves.

As shown in FIG. 6, either of the pressure side platform half 84 or the suction side platform half 86 can be formed by wrapping at least one ply 98 around a mandrel 100. The at least one ply 98 can include a carbon fiber pre-preg material or another composite material. In the illustrated example, the at least one ply 98 is formed to the mandrel 100 through the application of at least one of pressure or heat. The pressure is applied through force from a press 102 and the heat is applied from a heat source 104 to cure the at least one ply 98 to the shape of the mandrel 100. After the at least one ply 98 has been formed to the mandrel 100, the mandrel 100 can be removed to leave one of the pressure or suction side platform halves 84, 86.

Figure 7:
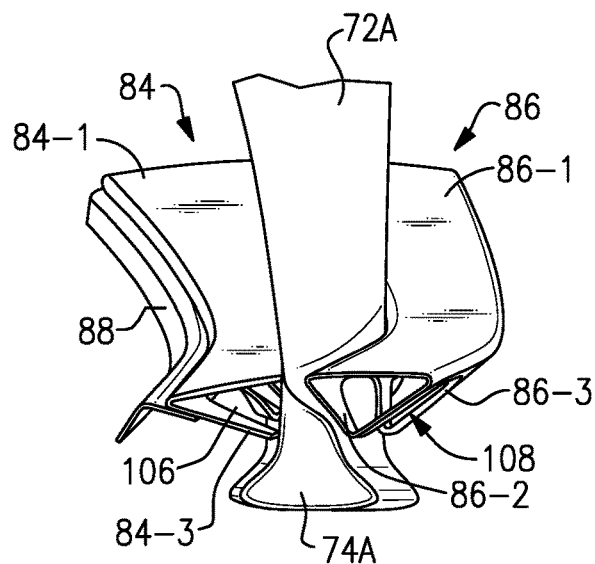
FIG. 7 is a frontal perspective schematic view of another fan blade platform having a pressure side platform half and a suction side platform half surrounding an airfoil.
Figure 8:
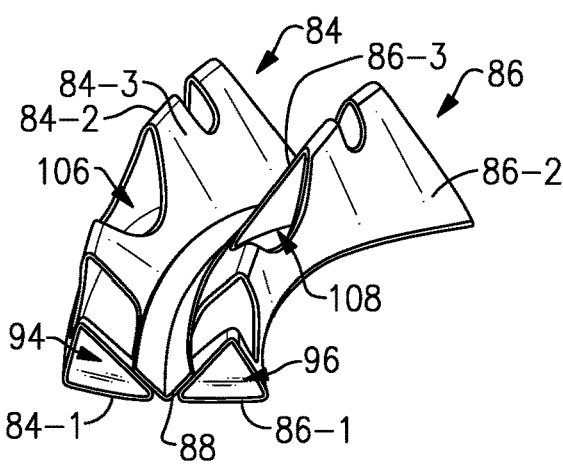
FIG. 8 is a radially outward perspective schematic view of the pressure side platform half and the suction side platform half of FIG. 7 adjacent each other.
Figure 9:
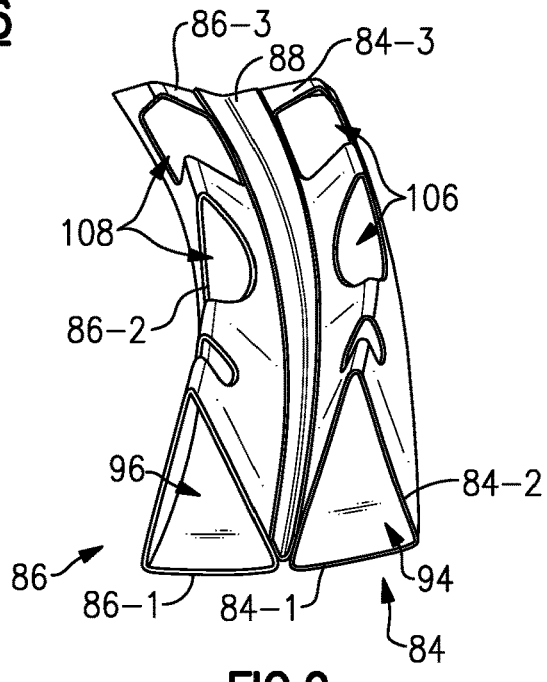
FIG. 9 is another radially outward perspective schematic view of the pressure side platform half and the suction side platform half of FIG. 7 adjacent each other.

As shown in FIGS. 7-9, a portion of at least one of the pressure or suction side platform halves 84, 86 can have material removed from at least one of the attachment walls 84-2, 86-2 or the connecting walls 84-3, 86-3, respectively. The material can be removed through at least one of a machining or cutting process. One feature of the removed material is a reduction in weight of the platform 82 as a whole. The removal of material leaves a plurality of openings 106, 108 in the pressure and suction side pressure halves 84, 86, respectively. The openings 106, 108 are positioned in areas of the pressure and suction side platform halves 84, 86, that experience reduced loads. Additionally, the openings 106, 108 can extend through an intersection of the attachment walls 84-2, 86-2 and the connecting walls 84-3, 86-3.

FIGS. 10 through 13 illustrate another example fan blade platform 182 similar to the fan blade platform 82 above except where described below or shown in the Figures. Similar or identical elements between the fan blade platform 82 and the fan blade platform 182 will include the addition of the leading one ("1").

The fan blade platform 182 extends between the first fan blade 72A and the second fan blade 72B. The fan blade platform 182 includes a pressure side platform half 184 and a suction side platform half 186. A seal 188 engages the pressure side platform half 184 and the suction side platform half 186. The pressure side platform half 184 is fixed relative to the pressure side 80B on the second fan blade 72B and the suction side platform half 186 is fixed relative to the suction side 81A of the first fan blade 72A.

The suction side platform half 186 includes a gas path wall 186-1, an attachment wall 186-2 and a connecting wall 186-3. In the illustrated example, the suction side platform half 186 is formed from a composite material including a plurality of plies or layers. The suction side platform half 186 includes a first edge 187-1 located at an intersection of the gas path wall 186-1 and the attachment wall 186-2. The first edge 187-1 follows a concave profile along the convex profile of the suction side 81A of the first fan blade 72A. A second edge 187-2 is located opposite the first edge 187-1 on a ledge 189 extending from an intersection of the first gas path wall 186-1 and the connecting wall 186-3. The second edge 187-2 follows a convex profile similar to the convex profile of the suction side 81A of the first fan blade 72A.

The pressure side platform half 184 includes a gas path wall 184-1, an attachment wall 184-2, and a connecting wall 184-3. In the illustrated example, the pressure side platform half 184 is formed from a composite material including a plurality of plies or layers. The pressure side platform half 184 includes a first edge 185-1 located at an intersection of the gas path wall 184-1 and the attachment wall 184-2. The first edge 185-1 follows a convex profile along the concave profile of the pressure side 80B of the second fan blade 72B. A second edge 185-2 is located opposite the first edge 185-1 on a ledge 191 extending from an intersection of the gas path wall 184-1 and the connecting wall 184-3. The second edge 185-2 follows a concave profile similar to the concave profile of the pressure side 80B while maintaining a constant gap or spacing with the convex profile of the second edge 187-2.

In the illustrated example, the seal 188 is located adjacent the second edges 185-2, 187-2 and is spaced from the connecting walls 184-3, 186-3, respectively, such the seal 188 is flat extending between the pressure side platform half 184 and the suction side platform half 186. By fixing the seal 188 to only one of the suction side platform half 86 and pressure side platform half 84, the seal 188 accommodates for movement cased by thermal growth and engine loading to prevent gas path air from leaking between the two platform halves 184, 186 and into the internal cavity. Also in the illustrated example, the seal 188 extends in a plane with a curvilineal profile to follow a profile of the second edges 185-2, 186-2. Therefore, the seal 188 does not extend linearly or straight but instead follows the curvilineal profile of the second edges 185-2, 187-2, as shown in the Figures.

The suction side platform half 186 is fixed relative to the suction side 81A of the first fan blade 72A with an adhesive film 190 and the pressure side platform half 84 is attached to the pressure side 80B of the second fan blade 72B with an adhesive film 192.

Figure 10A:
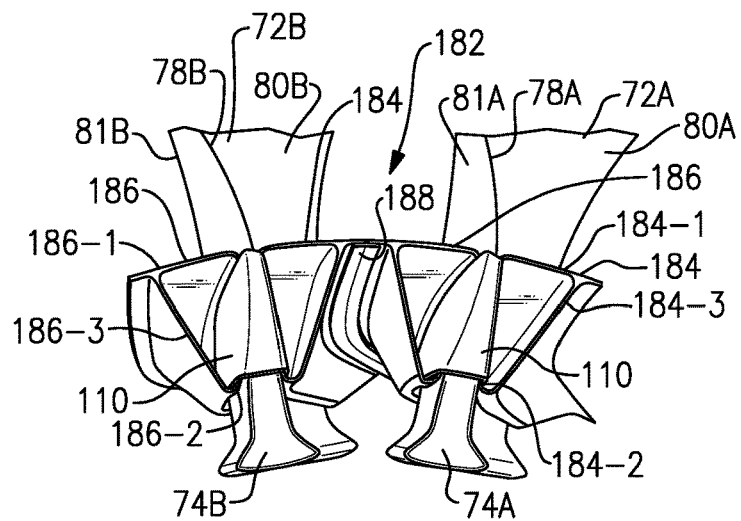
FIG. 10A is a perspective schematic view of yet another fan blade platform.
Figure 10B:
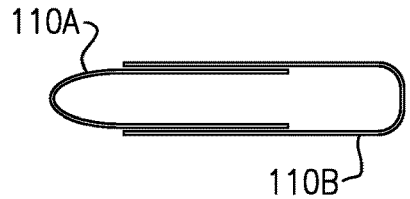
FIG. 10B is a top of an example two-piece ring.
Figure 11:
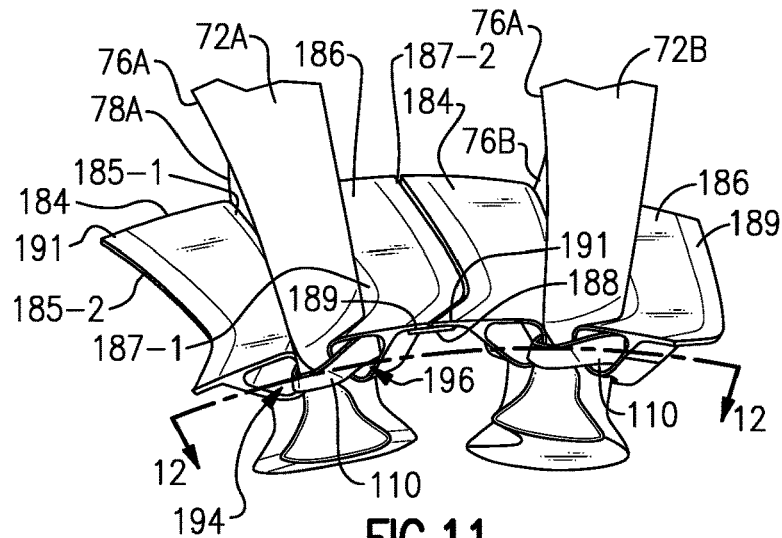
FIG. 11 is another perspective schematic view of the fan blade platform of FIG. 10.

As shown in FIGS. 10 and 11, the pressure side platform half 184 includes an internal passageway 194 that is at least partially defined by the gas path wall 184-1, the attachment wall 184-2, and the connecting wall 184-3. In the illustrated example, the internal passageway 194 defines a triangular profile with a radial height that increases when moving in an axially downstream direction. Furthermore, a cross-sectional area of an inlet (FIG. 11) to the internal passageway 94 is smaller than a cross-sectional area of an outlet (FIG. 10) to the internal passageway 94.

Similarly, the suction side platform half 186 includes an internal passageway 196. The internal passageway 196 is at least partially defined by the gas path wall 186-1, the attachment wall 186-2, and the connecting wall 186-3. In the illustrated example, the internal passageway 196 defines a triangular profile with a radial that increases when moving in an axially downstream direction. Furthermore, a cross-sectional area of an inlet (FIG. 11) to the internal passageway 196 is smaller than a cross-sectional area of an outlet (FIG. 10) of the internal passageway 196.

Figure 12:
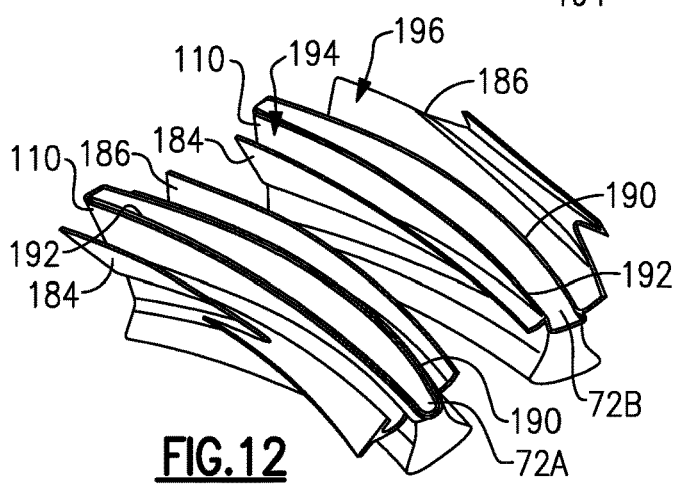
FIG. 12 is a cross-sectional schematic view taken along line 12-12 of FIG. 11.

As shown in FIGS. 10-12, a ring 110 extends through a corresponding one of the internal passageways 194, 196 and around a corresponding one of the fan blades 72A, 72B. The ring 110 could be continuous ring that is formed by wrapping a material through the internal passageways 194, 196 (FIG. 10A). Alternatively, a two-piece ring with a first C-shaped portion 110A and a second C-shaped portion 110B could extend through the passageways 194, 196 and around a corresponding one of fan blades 72A, 72B in an overlapping configuration as shown in FIG. 10B. The ring 110 provides a secondary attachment function to secure the pressure and suction side platform halves 184, 186 to the corresponding fan blade 72. The ring 110 could also be used with the pressure and suction side platform halves 84, 86 described above.

Figure 13:
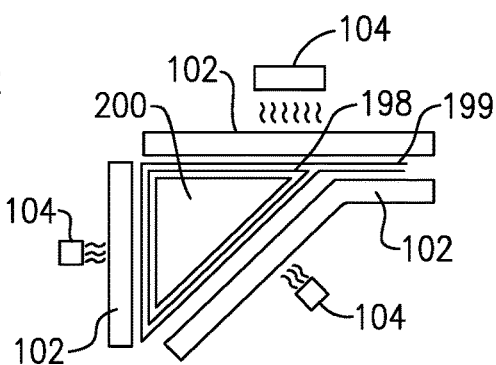
FIG. 13 illustrates a method of forming one of the pressure side or suction side platform halves of the fan blade platform of FIG. 10.

As shown in FIG. 13, either of the pressure side platform half 184 or the suction side platform half 186 are formed by wrapping at least one first ply 198 around the mandrel 200 and at least one second ply 199 around the at least one first ply 198 to form one of the ledges 189, 191. The at least one first and second plies 198, 199 can include a carbon fiber pre-preg material or another composite material. Pressure can then be applied with the press 102 with or without the application of heat from the heat source 104 to form the at least one first and second ply 198, 199 to the shape of the mandrel 200. After the at least one first and second plies 198, 199 have been formed, the mandrel 200 can be removed to leave one of the platform half 184, 186.

Figure 15:
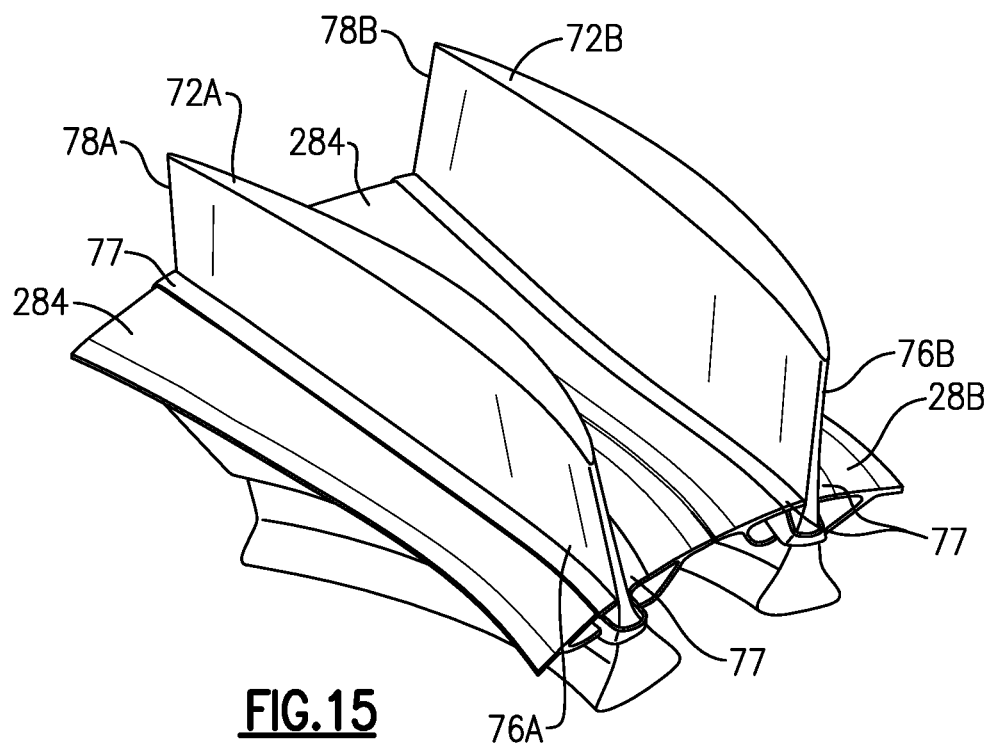
FIG. 15 is a side schematic view of the fan blade platform of FIG. 13.

FIGS. 14 and 15 illustrate another example fan blade platform 282 similar to the fan blade platform 182 above except where described below or shown in the Figures. Similar or identical elements between the fan blade platform 182 and the fan blade platform 282 will include the addition of the leading two ("2") in place of the leading one ("1").

The fan blade platform extends between the first fan blade 72A and the second fan blade 72B. The fan blade platform 282 includes a pressure side platform half 284 and a suction side platform half 286. A seal 288 engages the pressure side platform half 284 and the suction side platform half 286. The pressure side platform half 284 is fixed relative to the pressure side 80B on the second fan blade 72B and the suction side platform half 186 is fixed relative to the suction side 81A of the first fan blade 72A. A leading edge of the pressure and suction side platform halves 284, 286 extends axially forward of the leading edges 76A, 76B and a trailing edge of the pressure and suction side platform halves 284, 286 extends axially aft of the trailing edges 78A, 78B.

Additionally, the as shown in FIGS. 14 and 15, the first and second fan blades 72A, 72B each include a protrusions 77 on both the pressure sides 80A, 80B and the suction sides 81A, 81B. The protrusions 77 are located immediately radially outward of the platform halves 284, 286 to provide additional retention in the radial direction. The protrusions 77 are also integrally formed with a corresponding one of the fans blades 72A, 72B such that the protrusions 77 and fan blades form a single piece unitary component. In the illustrated example, the protrusions 77 extend from the leading edge 76A, 76B to the trailing edge 78A, 78B.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A fan blade platform assembly, comprising:
   a pressure side platform half including a first attachment wall, a first gas path wall, and a first connecting wall attached to both the first attachment wall and the first gas path wall;
   a suction side platform half including a second attachment wall, a second gas path wall, and a second connecting wall attached to both the second attachment wall and the second gas path wall; and
   a seal engaging the pressure side platform half and the suction side platform half, wherein the seal is in direct contact with one of the first connecting wall and the second connecting wall and is in moveable engagement with the other of the first connecting wall and the second connecting wall and the seal is V-shaped and follows a curvilinear path in an axial direction.

2. The assembly of claim 1, wherein the first attachment wall includes an adhesive for securing the pressure side platform half to a fan blade and the second attachment wall includes an adhesive for securing the suction side platform half to a suction side of an adjacent fan blade.

3. The assembly of claim 1, further comprising:
   a first edge located at an intersection of the first gas path wall and the first attachment wall; and
   a second edge located at an intersection of the first gas path wall and the first connecting wall;
   wherein the second edge is located opposite the first edge on the first gas path wall, the first edge of the first gas path wall follows a first convex profile, and the second edge of the first gas path wall follows a second concave profile.

4. The assembly of claim 3, further comprising:
   a first edge located at an intersection of the second gas path wall and the second attachment wall; and
   a second edge located at an intersection of the second gas path wall and the second connecting wall;
   wherein the second edge is located opposite the first edge on the second gas path wall, the first edge of the second gas path wall follows a first concave profile, and the second edge of the second gas path wall follows a second convex profile.

5. The assembly of claim 1, further comprising at least one passageway extending through at least one of the first attachment wall or the first connecting wall and at least one second passageway extending through at least one of the second attachment wall or the second connecting wall.

6. The assembly of claim 1, wherein:
   the first attachment wall, the first gas path wall, and the first connecting wall define a first internal passage having an inlet cross-sectional area at an inlet to the first internal passage that is smaller than an outlet cross-sectional area at an outlet to the first internal passage; and
   the second attachment wall, the second gas path wall, and the second connecting wall define a second internal passage having an inlet cross-sectional area at an inlet to the second internal passage that is smaller than an outlet cross-sectional area at an outlet to the second internal passage.

7. The assembly of claim 1, wherein at least one single ply of material extends through the first attachment wall, the first gas path wall, and the first connecting wall.

* * * * *